E. P. HARRIS.
SECURING MEANS.
APPLICATION FILED AUG. 13, 1921.
1,432,243.
Patented Oct. 17, 1922.
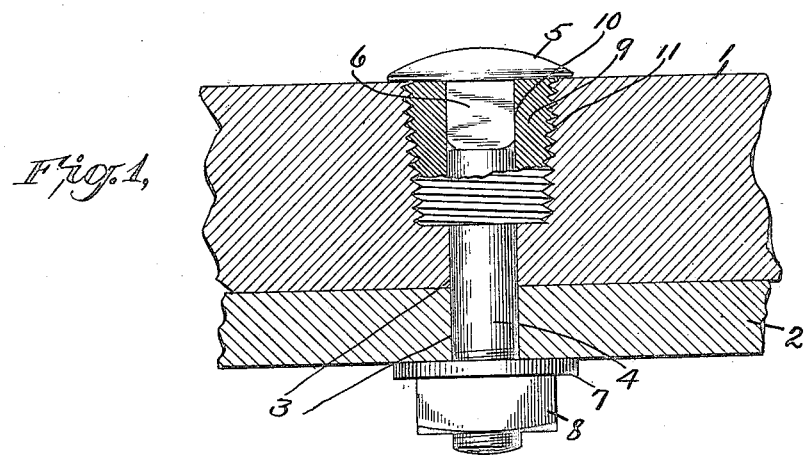
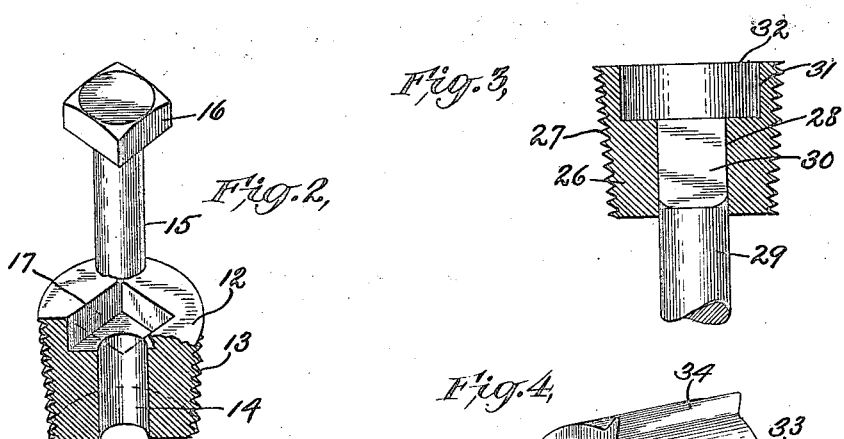
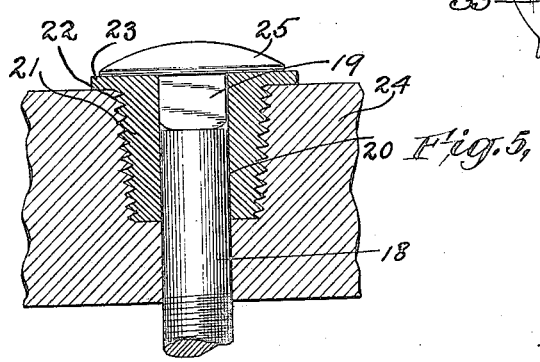
INVENTOR
Elmer P. Harris
BY
Kiddle & Margeson
ATTORNEYS.

Patented Oct. 17, 1922.

1,432,243

UNITED STATES PATENT OFFICE.

ELMER P. HARRIS, OF NEW YORK, N. Y.

SECURING MEANS.

Application filed August 13, 1921. Serial No. 491,965.

*To all whom it may concern:*

Be it known that I, ELMER P. HARRIS, a citizen of the United States, and a resident of the borough of Manhattan, city, county, and State of New York, have invented certain new and useful Improvements in Securing Means, of which the following is a specification.

My invention relates broadly to an improvement in securing means, and specifically to an improved bolt by which a plurality of members may be secured or clamped to each other.

With the ordinary bolt as at present constructed great difficulty is experienced in holding the bolt against rotation while setting up the nut, and this is particularly true with bolts having a round head when employed to clamp a plurality of wooden members to each other. To overcome this difficulty the shank of the bolt has heretofore been made square in cross section, yet while this may prevent rotation of the bolt initially it has been found that the holes through which the shank of the bolt is passed soon wear round with the result that the bolt is no longer held against rotation and the flattened portion of the bolt shank is no longer effective.

To eliminate these drawbacks I conceived the present invention.

Briefly I have provided a bolt comprising the usual head and shank, the shank having a portion thereof threaded in the usual way so as to receive a nut, and in addition I shape the unthreaded portion so that it is square, rectangular, or otherwise non-circular in cross section. In addition the bolt comprises a bushing, preferably tapered and threaded on its exterior, the threads on the bushing being of the opposite hand to those on the bolt. The purpose of so forming the threads on the bushing will be pointed out hereinafter. The bushing is bored through from end to end so as to receive the unthreaded portion of the bolt shank heretofore referred to, it being understood that the bore in the bushing conforms to the cross section of the bolt shank so that relative rotation of the bolt and bushing is prevented. In applying my improved bolt it is merely necessary to bore a hole through the members to be clamped or secured to each other. The bushing is then screwed into this hole until flush with the surface of one of the members to be clamped and then the bolt shank is passed through the bushing and the members being clamped. The bolt is passed into the bushing from the top thereof with the squared portion of the bolt shank engaging the walls of the bore in the bushing and the head of the bolt in engagement with the top of the bushing. If now the nut be applied to the bolt shank no difficulty will be experienced in setting it up to any desired degree, for it will be remembered that the bolt cannot turn in the bushing, and by reason of the threads on the bolt shank and those on the bushing being of opposite hands any tendency of the bolt to turn will merely turn down the bushing to increase the clamping action of the bolt as a whole. Of course, inasmuch as the bushing is made of metal or other like material the bore in the bushing will not wear round and hence relative rotation of the bushing and bolt shank is always prevented.

While I have spoken of the bushing as being threaded exteriorly and preferably tapered my object may be attained more or less as well by providing a straight sided bushing and if desired substituting fins for the threads on the bushing. In this event of course rotation of the bushing as well as relative rotation of the bushing and bolt will be prevented.

In the accompanying drawings I have illustrated several embodiments of my invention:—

Figure 1 shows in part sectional elevation the preferred form of my invention; Figures 2, 3 and 5 show in part sectional elevation modifications of the form shown in Figure 1; and Figure 4 is a modified form of bushing.

Referring to the drawings in detail and first of all to the form of my invention illustrated in Figure 1, 1 and 2 indicate respectively two members to be clamped or secured to each other. These members are each provided with a hole or opening 3 which hole or opening is adapted to receive my improved bolt and by which bolt the two members are to be clamped or secured to each other. The bolt comprises a shank 4 which shank is threaded throughout part of its length and is provided with head 5 the head when the bolt is in position preferably engaging the upper surface of the member 1 already referred to. The upper part of the shank 4; that is to say, that part of the shank adjacent the head 5 is flattened as indicated at 6 this flattened portion being square or rectangular in cross section as desired or any other desired cross section other than circular. The lower end or threaded portion of the shank receives a washer 7 which is adapted to engage the under-surface of the member 2 and a nut 8. The upper end of the shank of the bolt is provided with a bushing 9 this bushing being provided with an opening or bore 10 which is of the same cross section as the portion 6 of the shank so that relative rotation of the bushing and bolt is effectively prevented. The bushing is preferably though not necessarily slightly tapered and is threaded on its exterior as indicated at 11 the threads on the exterior of the bushing being of the opposite hand and preferably of a different pitch to those on the shank 4 of the bolt. In use the bushing 9 is screwed into the member 1 from the upper side thereof until the top of the bushing is substantially flush with the top surface of the member 1. The shank of the bolt is then inserted in the opening or bore 10 in the bushing and allowed to pass down through the bushing until the head 5 abuts the upper surface of the member 1. The washer 7 is then applied and the nut 8 in the usual way. Should the nut 8 not work freely on the shank 4 so that there is a tendency of the shank of the bolt to rotate this will have the effect of turning down the bushing 9 inasmuch as above noted the threads on the exterior of the bushing are of the opposite hand to those on the shank of the bolt. In any event when the nut 8 is finally set up the two members 1 and 2 will be securely clamped or secured to each other this clamping action being increased by the difference in pitch between the threads on the bushing and the threads on the bolt and the tendency of the bushing 9 to move toward the nut 8.

It will be seen from the foregoing that I have provided an improved bolt which comprises the usual shank, nut and washer and in addition a bushing which is threaded oppositely to the shank of the bolt and that by the provision of such a securing or clamping means the difficulty experienced with bolts as heretofore constructed is eliminated. This is particularly true where the bolts are employed with wooden members; that is to say, where the member 1 is of wood, for by providing the bushing 9 as I have done it is immaterial whether the usual hole or opening in the member 1 remains circular in cross section or not.

In the embodiment of my invention as illustrated in Figure 2, 12 indicates a bushing which is similar to the bushing 9 of Figure 1 being provided with exterior threads 13 and an opening 14 for receiving the shank 15 of the bolt. In this instance however, it is unnecessary to provide a flattened portion similar to the portion 6 of the shank 4 inasmuch as I here provide my improved bolt with a square head 16 and which head when the bolt is in place in the bushing is adapted to be received by a recess 17 in the top of the bushing so that here again relative rotation of the bolt and bushing is effectively prevented. It will be understood of course that this modified form of my invention is employed in the same way as the form shown in Figure 1.

In the Figure 5 I have illustrated a further modification of my invention. In this instance a bolt shank 18 having been illustrated which shank is flattened at 19 to conform to an opening 20 in a bushing 21 which is similar to the bushing 9 of Figure 1. This bushing is exteriorly threaded at 22, the threads being of the opposite hand to those on the shank of the bolt. In this instance however, I provide the upper part of the bushing with an annular flange 23 which is adapted when the bushing is screwed down to engage the upper surface of one of the members 24 to be clamped, this flange when the bolt is in place being engaged by the head 25 of the bolt.

In Figure 3 a bushing 26 is illustrated this bushing being threaded on its exterior as indicated at 27 provided with an opening 28 for the reception of the shank 29 of the bolt. This opening 28 is shaped so as to conform to the shape of the portion 30 of the shank which portion may be square, rectangular or otherwise non-circular in cross section. The upper part of the bushing is provided with a recess 31 which is adapted to receive the head 32 of the bolt, this head as will be observed from the drawing being flush with the top of the bushing. Here again the threads 27 on the exterior of the bushing are of the opposite hand to those on the shank of the bolt.

In Figure 4 I have illustrated a modified form of bushing which is adapted to be used with bolts having shanks such as illustrated in Figure 1, for example. This bushing which is designated 33 is straight-sided, provided with a series of fins 34, four of these fins having been shown in my illustration. The bushing is bored as indicated at 35, the bore being square in cross section so as to conform to a shank having a similar cross section. It is to be noted of course that the bore 35 may be of other shapes, such as rectangular, for example, if desired. The operation of this bushing is slightly different from the bushings of the other figures of the drawings inasmuch as it is positively held against rotation by the fins 34. It will be seen, however, that it will prevent rotation of the bolt when setting up the nut on the bolt so that to this extent it is as effective as the other forms of bushing already described. In use this bushing is merely driven into one of the members to be clamped and the bolt is then inserted in the bore 35 in the usual manner.

From the foregoing it will be seen that I have provided a novel means whereby two members may readily be clamped together and whereby wearing of the hole or opening in the members to be clamped and which hole or opening receives the bolt, is eliminated. This of course prevents turning of the bolt in its hole so that no difficulty will be experienced in tightening up the nut on the bolt so as to clamp the two or more members together.

It will be remembered that I have described the various embodiments of my improved securing means as comprising among other things, a bushing which is tapered, but it is to be understood that to make a straight-sided threaded bushing comes within the scope of this invention, the tapered side having been provided so that the bushing may easily be screwed down in place.

What I claim is:

1. In combination, a threaded bolt, a bushing slidable on said bolt, said bushing being threaded exteriorly, the threads on the bushing being of the opposite hand to those on said bolt.

2. In combination, a threaded bolt, an exteriorly threaded bushing on said bolt, the threads of which are of the opposite hand and of a different pitch to those on the bolt.

3. In combination, a threaded bolt a portion of the shank of which is non-circular in cross section, a bushing provided with an opening the cross section of which conforms to the non-circular cross section of the shank of the bolt, the said bushing being provided with threads of the opposite hand to those on the bolt.

4. As an article of manufacture a bolt for clamping two members together comprising a shank adapted to pass through both members, said shank being threaded throughout part of its length, a nut adapted to be received by said threaded shank, a head for the bolt, and a bushing on said shank adapted to be received by one of the members to be clamped said bushing being non-rotatable with respect to said shank and provided with threads on its exterior for holding it against rotation with respect to the member to be clamped by which it is received, the threads on the bushing being on the opposite hand to those of the shank.

5. As an article of manufacture, a bolt comprising a head, a shank, a portion of the latter being square in cross section and another portion threaded, and a bushing provided with a square opening for receiving the squared portion of the shank of the bolt and with threads on its exterior said threads being of the opposite hand to those on the shank of the bolt.

6. As an article of manufacture, a bolt comprising a head, a shank threaded for part of its length, and a tapered threaded bushing on said shank, the threads of the bushing being of the opposite hand to those on the bolt shank.

This specification signed this 12th day of August, 1921.

ELMER P. HARRIS.